United States Patent
Hsu

(10) Patent No.: US 10,206,255 B1
(45) Date of Patent: Feb. 12, 2019

(54) INTELLECTUAL CONTROL SYSTEM HAVING DIMMING AND COLOR TEMPERATURE REGULATING FUNCTIONS

(71) Applicant: Dong Guan Bright Yinhuey Lighting Co., ltd., Guang Dong (CN)

(72) Inventor: Kevin Hsu, Taichung (TW)

(73) Assignee: Dong Guan Bright Yinhuey Lighting Co., Ltd., Guang Dong (CN)

( * ) Notice: Subject to any disclaimer, the term of this patent is extended or adjusted under 35 U.S.C. 154(b) by 0 days.

(21) Appl. No.: 15/950,299

(22) Filed: Apr. 11, 2018

(51) Int. Cl.
*H05B 33/08* (2006.01)
*H05B 37/02* (2006.01)

(52) U.S. Cl.
CPC ..... *H05B 33/0821* (2013.01); *H05B 33/0854* (2013.01); *H05B 33/0872* (2013.01); *H05B 37/0218* (2013.01); *H05B 37/0227* (2013.01); *H05B 37/0281* (2013.01)

(58) Field of Classification Search
None
See application file for complete search history.

(56) References Cited

U.S. PATENT DOCUMENTS

2015/0351191 A1\* 12/2015 Pope .................. H05B 33/0863
315/294

\* cited by examiner

*Primary Examiner* — Jany Richardson
(74) *Attorney, Agent, or Firm* — Alan D. Kamrath; Kamrath IP Lawfirm, P.A.

(57) ABSTRACT

An intellectual control system includes a power supply input terminal, a primary controller, a controller signal terminal, a detector, a current output terminal and an LED module. The power supply input terminal, the primary controller the controller signal terminal and the detector are connected serially. The primary controller includes a function switch which is connected with the LED module through the current output terminal. The primary controller outputs a regulated low-voltage direct-current to the LED module. The LED module includes at least two LEDs having different color temperatures. The LED module has a whole color temperature that is regulated by changing an input current of the at least two LEDs of the LED module. The function switch of the primary controller adjusts a working state of the LED module. The detector includes a human body sensor and an optical sensor.

3 Claims, 1 Drawing Sheet

Figure 1:
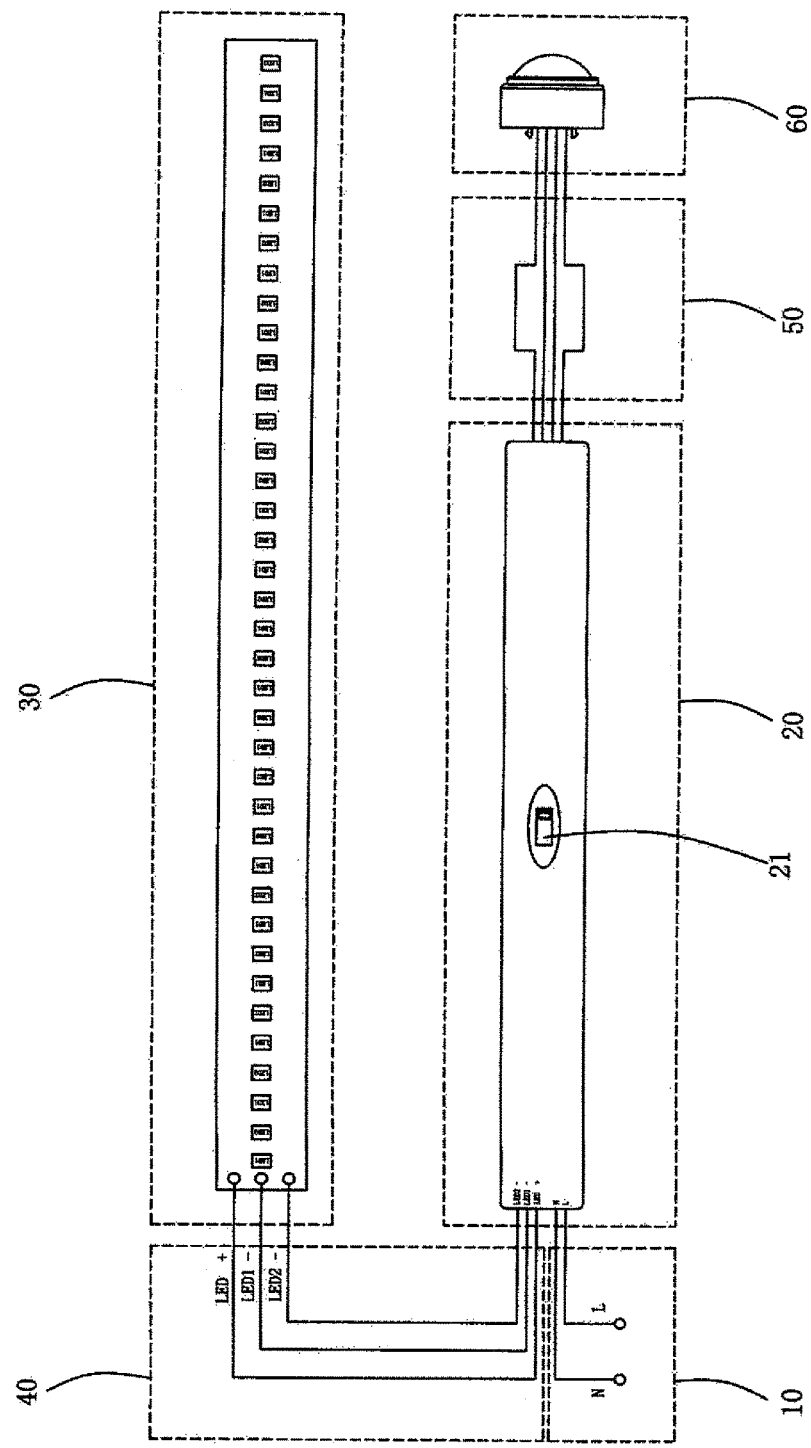

INTELLECTUAL CONTROL SYSTEM HAVING DIMMING AND COLOR TEMPERATURE REGULATING FUNCTIONS

BACKGROUND OF THE INVENTION

1. Field of the Invention

The present invention relates to an illuminating system and, more particularly, to an intellectual control system.

2. Description of the Related Art

A conventional lamp comprises at least one LED to provide an illuminating function. The conventional lamp usually has a dimming function to adjust the brightness of the LED according to the practical requirement. However, the conventional lamp cannot change the color temperature of the LED when regulating the brightness of the LED. In addition, the conventional lamp only has a single dimming function and cannot satisfy the user's diverse requirements.

BRIEF SUMMARY OF THE INVENTION

The primary objective of the present invention is to provide an intellectual control system having dimming and color temperature regulating functions.

In accordance with the present invention, there is provided an intellectual control system comprising a power supply input terminal, a primary controller, a controller signal terminal, a detector, a current output terminal and an LED module. The power supply input terminal, the primary controller the controller signal terminal and the detector are connected serially. The primary controller includes a function switch. The current output terminal is connected between the function switch of the primary controller and the LED module, with the function switch of the primary controller being connected with the LED module through the current output terminal. The primary controller outputs a regulated low-voltage direct-current to the LED module. The LED module includes at least two LEDs having different color temperatures. The LED module has a whole color temperature that is regulated by changing an input current of the at least two LEDs of the LED module. The function switch of the primary controller adjusts a working state of the LED module, to adjust a lighting effect of the LED module according to a requirement of a user. The detector includes a human body sensor and an optical sensor to detect human body infrared rays and lighting strength.

Preferably, the primary controller controls at least two values of voltage/current of the low-voltage direct-current to correspond to the color temperatures of the at least two LEDs of the LED module. The primary controller includes a timer. When the timer starts timing, the primary controller regulates current values of the at least two LEDs of the LED module during a period of time interval, to change the whole color temperature of the LED module according to the time interval, with a cycle of every twenty four (24) hours.

Preferably, the detector detects a human activity and feeds back a signal to the primary controller. When no human activity is detected in a predetermined range, the primary controller regulates an output current to turn off the LED module or to turn on the LED module with a decreased brightness. When a human motion is detected in the predetermined range, the primary controller regulates the output current to turn on the LED module with a full lighting. After the human motion disappears in the predetermined range, the primary controller again regulates the output current to turn off the LED module or to turn on the LED module with a decreased brightness.

Preferably, the detector detects a brightness of an ambient environment and feeds back a signal to the primary controller. When the brightness of the ambient environment reaches a preset value, the primary controller regulates the output current to dim and decrease a brightness of the LED module. When the brightness of the ambient environment is smaller than the preset value, the primary controller regulates the output current to increase the brightness of the LED module until the brightness of the ambient environment reaches the preset value.

According to the primary advantage of the present invention, the primary controller regulates the output current to adjust the working color temperatures of the at least two LEDs of the LED module.

According to another advantage of the present invention, the primary controller is connected with the detector which collects an external information of the ambient environment and feeds back a signal to the primary controller.

According to a further advantage of the present invention, the LED module is switched between different working states by operation of the primary controller according to the practical requirement, thereby enhancing the versatility of the intellectual control system.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

FIG. 1 is a circuit layout of an intellectual control system in accordance with the preferred embodiment of the present invention.

DETAILED DESCRIPTION OF THE INVENTION

Referring to FIG. 1, an intellectual control system in accordance with the preferred embodiment of the present invention comprises a power supply input terminal 10, a primary controller 20, a controller signal terminal 50, a detector 60, a current output terminal 40 and an LED module 30. The power supply input terminal 10, the primary controller 20, the controller signal terminal 50 and the detector 60 are connected serially. The primary controller 20 includes a function switch 21. The current output terminal 40 is connected between the function switch 21 of the primary controller 20 and the LED module 30, so that the function switch 21 of the primary controller 20 is connected with the LED module 30 through the current output terminal 40.

In practice, the primary controller 20 outputs a regulated low-voltage direct-current to the LED module 30. The LED module 30 includes at least two LEDs having different color temperatures. The LED module 30 has a whole color temperature that is regulated by changing an input current of the at least two LEDs of the LED module 30. The function switch 21 of the primary controller 20 adjusts a working state of the LED module 30, to adjust a lighting effect of the LED module 30 according to the requirement of a user. The detector 60 includes a human body sensor and an optical sensor to detect human body infrared rays and lighting strength.

The function switch 21 of the primary controller 20 is switched between three functions that are described as follows.

In the first function of the function switch 21, the primary controller 20 controls at least two values of voltage/current of the low-voltage direct-current to correspond to the color temperatures of the at least two LEDs of the LED module 30. The primary controller 20 includes a timer. When the timer starts timing, the primary controller 20 regulates current values of the at least two LEDs of the LED module 30 during a period of time interval, to change the whole color temperature of the LED module 30 according to the time interval, with a cycle of every twenty four (24) hours.

In the second function of the function switch 21, the detector 60 detects a human activity and feeds back a signal to the primary controller 20. When no human activity is detected in a predetermined range, the primary controller 20 regulates an output current to turn off the LED module 30 or to turn on the LED module 30 with a decreased brightness (such as 20% of the full lighting). When a human motion is detected in the predetermined range, the primary controller 20 regulates the output current to turn on the LED module 30 with the full lighting. After the human motion disappears in the predetermined range, the primary controller 20 again regulates the output current to turn off the LED module 30 or to turn on the LED module 30 with a decreased brightness.

In the third function of the function switch 21, the detector 60 detects a brightness of an ambient environment and feeds back a signal to the primary controller 20. When the brightness of the ambient environment reaches a preset value, the primary controller 20 regulates the output current to dim and decrease a brightness of the LED module 30. When the brightness of the ambient environment is smaller than the preset value, the primary controller 20 regulates the output current to increase the brightness of the LED module 30 until the brightness of the ambient environment reaches the preset value.

Accordingly, the primary controller 20 regulates the output current to adjust the working color temperatures of the at least two LEDs of the LED module 30. In addition, the primary controller 20 is connected with the detector 60 which collects an external information of the ambient environment and feeds back a signal to the primary controller 20. Further, the LED module 30 is switched between different working states by operation of the primary controller 20 according to the practical requirement, thereby enhancing the versatility of the intellectual control system.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the scope of the invention.

The invention claimed is:

1. An intellectual control system comprising:
a power supply input terminal, a primary controller, a controller signal terminal, a detector, a current output terminal and an LED module;
wherein:
the power supply input terminal, the primary controller the controller signal terminal and the detector are connected serially;
the primary controller includes a function switch;
the current output terminal is connected between the function switch of the primary controller and the LED module, with the function switch of the primary controller being connected with the LED module through the current output terminal;
the primary controller outputs a regulated low-voltage direct-current to the LED module;
the LED module includes at least two LEDs having different color temperatures;
the LED module has a whole color temperature that is regulated by changing an input current of the at least two LEDs of the LED module;
the function switch of the primary controller adjusts a working state of the LED module, to adjust a lighting effect of the LED module according to a requirement of a user;
the detector includes a human body sensor and an optical sensor to detect human body infrared rays and lighting strength;
the primary controller controls at least two values of voltage/current of the low-voltage direct-current to correspond to the color temperatures of the at least two LEDs of the LED module;
the primary controller includes a timer; and
when the timer starts timing, the primary controller regulates current values of the at least two LEDs of the LED module during a period of time interval, to change the whole color temperature of the LED module according to the time interval, with a cycle of every twenty four (24) hours.

2. The intellectual control system of claim 1, wherein:
the detector detects a human activity and feeds back a signal to the primary controller;
when no human activity is detected in a predetermined range, the primary controller regulates an output current to turn off the LED module or to turn on the LED module with a decreased brightness;
when a human motion is detected in the predetermined range, the primary controller regulates the output current to turn on the LED module with a full lighting; and
after the human motion disappears in the predetermined range, the primary controller again regulates the output current to turn off the LED module or to turn on the LED module with a decreased brightness.

3. The intellectual control system of claim 1, wherein:
the detector detects a brightness of an ambient environment and feeds back a signal to the primary controller;
when the brightness of the ambient environment reaches a preset value, the primary controller regulates the output current to dim and decrease a brightness of the LED module; and
when the brightness of the ambient environment is smaller than the preset value, the primary controller regulates the output current to increase the brightness of the LED module until the brightness of the ambient environment reaches the preset value.

* * * * *